(12) United States Patent
Ernst

(10) Patent No.: US 6,283,545 B1
(45) Date of Patent: Sep. 4, 2001

(54) INFANT CARRIER LOADING DEVICE

(76) Inventor: Susan Lynn Ernst, 2770 NW. 108th Ave., Sunrise, FL (US) 33322

( * ) Notice: Subject to any disclaimer, the term of this patent is extended or adjusted under 35 U.S.C. 154(b) by 0 days.

(21) Appl. No.: 09/833,472

(22) Filed: Apr. 12, 2001

(51) Int. Cl.$^7$ .................................................. B60N 2/28
(52) U.S. Cl. ............................... 297/256.16; 297/250.1; 297/256.12
(58) Field of Search ................................ 297/130, 250.1, 297/256.1, 256.12, 256.16

(56) References Cited

U.S. PATENT DOCUMENTS

| | | |
|---|---|---|
| D. 323,432 | 1/1992 | Morton . |
| 2,865,427 * | 12/1958 | Garfield ............................. 297/256.1 |
| 3,404,917 * | 10/1968 | Smith ................................ 297/256.1 |
| 4,241,893 | 12/1980 | Koutsky et al. . |
| 4,846,529 | 7/1989 | Tulley . |
| 4,936,629 | 6/1990 | Young . |
| 4,971,392 | 11/1990 | Young . |
| 5,183,312 | 2/1993 | Nania . |
| 6,158,807 * | 12/2000 | Hampton ........................... 297/250.1 |
| 6,241,314 * | 6/2001 | Pufall ........................... 297/256.16 X |

* cited by examiner

Primary Examiner—Peter R. Brown

(57) ABSTRACT

An infant carrier loading device for facilitating the loading and unloading of an infant carrier. The infant carrier loading device includes a pair of rails integrally coupled to a bottom surface of an infant carrier. A base member is positioned on a car seat and includes a rigid panel having a top surface with a pair of elongate grooves therein for receiving the rails. A slide member has a size and shape substantially equal to the panel of the base member. The slide member has a pair of slots therein extending from a first side edge to a second side edge. The slide member is abutted against the base member and the slots aligned with the grooves so that the rails on the carrier may be moved along the slots and the grooves and slid onto or off from the base member.

9 Claims, 4 Drawing Sheets

INFANT CARRIER LOADING DEVICE

BACKGROUND OF THE INVENTION

1. Field of the Invention

The present invention relates to infant carrier devices and more particularly pertains to a new infant carrier loading device for facilitating the loading and unloading of an infant carrier.

2. Description of the Prior Art

The use of infant carrier devices is known in the prior art. More specifically, infant carrier devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,971,392; 4,936,629; 5,183,312; 4,846,529; 4,241,893; and U.S. Des. Pat. No. 323,432.

While these devices fulfill their respective, particular objectives and requirements, the aforementioned patents do not disclose a new infant carrier loading device. The inventive device includes a pair of rails is integrally coupled to a bottom surface of a bottom wall of an infant carrier. A base member being positioned on a car seat and including a rigid panel having a top surface with a pair of elongate grooves therein for receiving the rails. A slide member for sliding the carrier onto the base member includes a substantially rigid plate that has a size and shape substantially equal to a size and shape of the panel of the base member. The slide member has a pair of slots therein extending from a first side edge to a second side edge. The second side edge of the slide member may be abutted against the first side edge of the base member such that the slots are generally aligned with the grooves so that the rails on the carrier may be moved along the slots and the grooves for positioning on and removing the carrier from the base member.

In these respects, the infant carrier loading device according to the present invention substantially departs from the conventional concepts and designs of the prior art, and in so doing provides an apparatus primarily developed for the purpose of facilitating the loading and unloading of an infant carrier.

SUMMARY OF THE INVENTION

In view of the foregoing disadvantages inherent in the known types of infant carrier devices now present in the prior art, the present invention provides a new infant carrier loading device construction wherein the same can be utilized for facilitating the loading and unloading of an infant carrier.

The general purpose of the present invention, which will be described subsequently in greater detail, is to provide a new infant carrier loading device apparatus and method which has many of the advantages of the infant carrier devices mentioned heretofore and many novel features that result in a new infant carrier loading device which is not anticipated, rendered obvious, suggested, or even implied by any of the prior art infant carrier devices, either alone or in any combination thereof.

To attain this, the present invention generally comprises a pair of rails is integrally coupled to a bottom surface of a bottom wall of an infant carrier. A base member being positioned on a car seat and including a rigid panel having a top surface with a pair of elongate grooves therein for receiving the rails. A slide member for sliding the carrier onto the base member includes a substantially rigid plate that has a size and shape substantially equal to a size and shape of the panel of the base member. The slide member has a pair of slots therein extending from a first side edge to a second side edge. The second side edge of the slide member may be abutted against the first side edge of the base member such that the slots are generally aligned with the grooves so that the rails on the carrier may be moved along the slots and the grooves for positioning on and removing the carrier from the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new infant carrier loading device apparatus and method which has many of the advantages of the infant carrier devices mentioned heretofore and many novel features that result in a new infant carrier loading device which is not anticipated, rendered obvious, suggested, or even implied by any of the prior art infant carrier devices, either alone or in any combination thereof.

It is another object of the present invention to provide a new infant carrier loading device which may be easily and efficiently manufactured and marketed.

It is a further object of the present invention to provide a new infant carrier loading device which is of a durable and reliable construction.

An even further object of the present invention is to provide a new infant carrier loading device which is susceptible of a low cost of manufacture with regard to both materials and labor, and which accordingly is then susceptible of low prices of sale to the consuming public, thereby making such infant carrier loading device economically available to the buying public.

Still yet another object of the present invention is to provide a new infant carrier loading device which provides in the apparatuses and methods of the prior art some of the advantages thereof, while simultaneously overcoming some of the disadvantages normally associated therewith.

Still another object of the present invention is to provide a new infant carrier loading device for facilitating the loading and unloading of an infant carrier.

Yet another object of the present invention is to provide a new infant carrier loading device which includes a pair of rails is integrally coupled to a bottom surface of a bottom wall of an infant carrier. A base member being positioned on a car seat and including a rigid panel having a top surface with a pair of elongate grooves therein for receiving the rails. A slide member for sliding the carrier onto the base member includes a substantially rigid plate that has a size and shape substantially equal to a size and shape of the panel of the base member. The slide member has a pair of slots therein extending from a first side edge to a second side edge. The second side edge of the slide member may be abutted against the first side edge of the base member such that the slots are generally aligned with the grooves so that the rails on the carrier may be moved along the slots and the grooves for positioning the carrier on and removing the carrier from the base member.

Still yet another object of the present invention is to provide a new infant carrier loading device that allow a user to pull the infant carrier toward them and rotate it so that it easier to maneuver the infant carrier through a vehicle door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
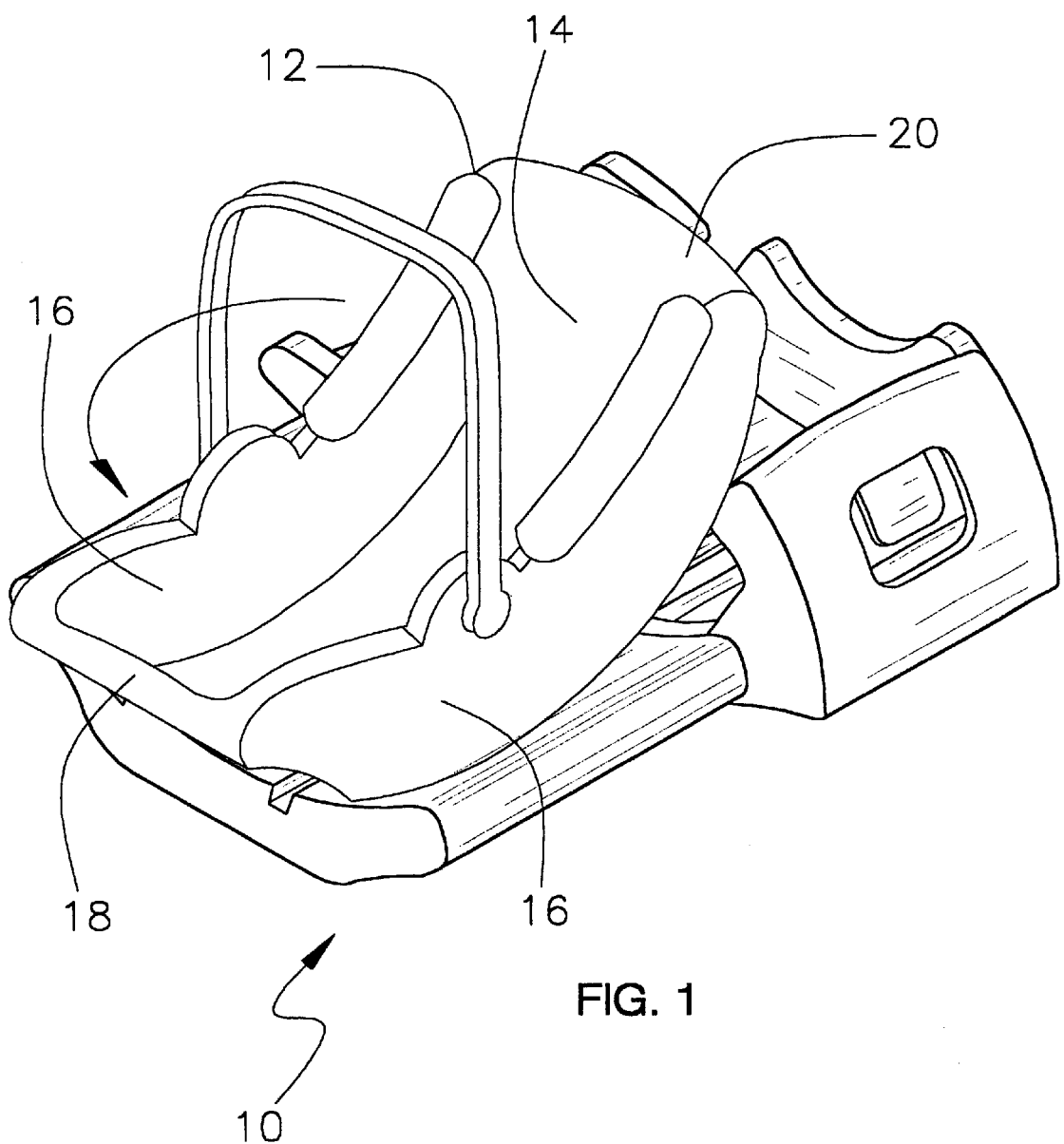
FIG. 1 is a schematic perspective view of a new infant carrier loading device according to the present invention.
Figure 2:
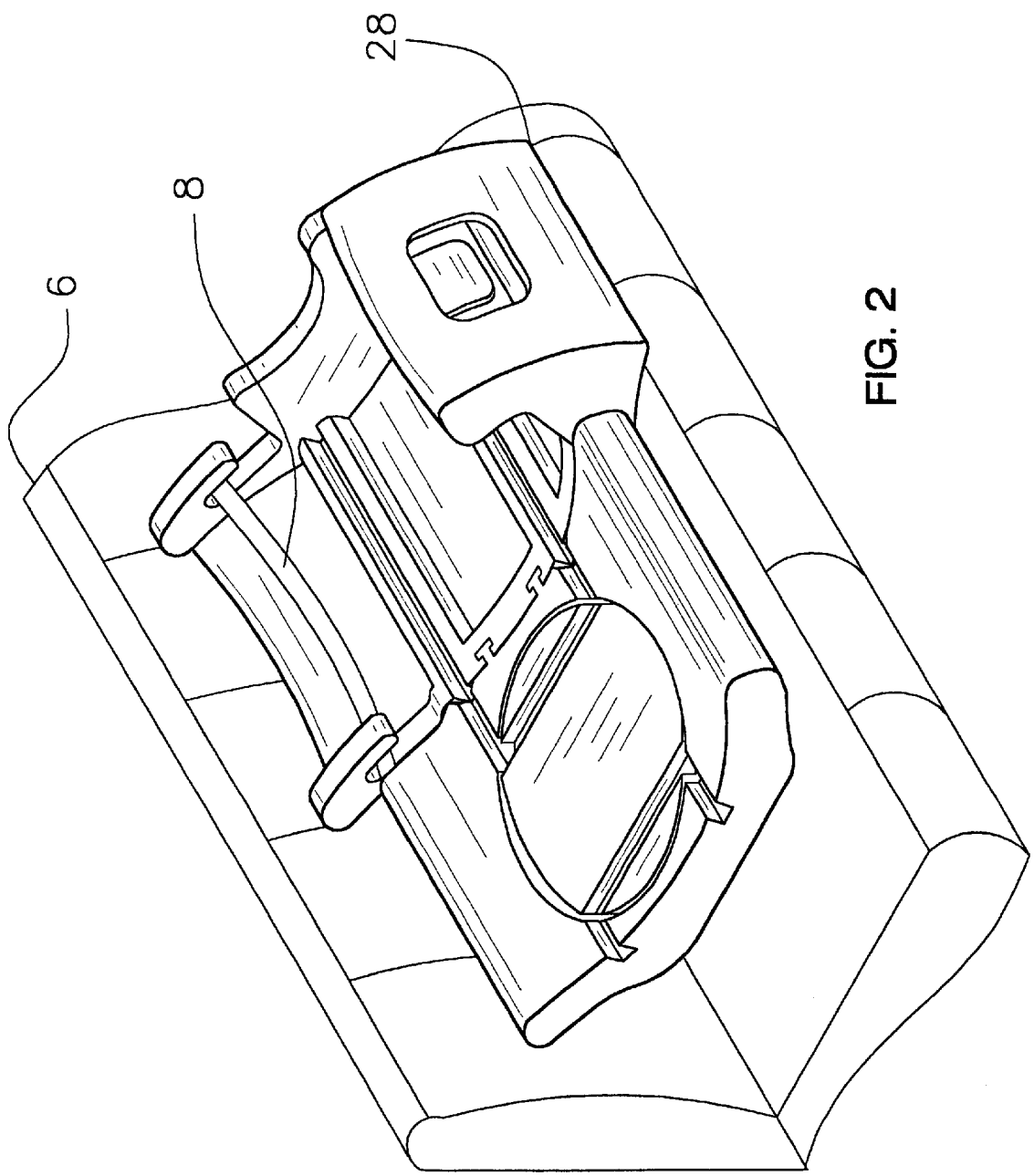
FIG. 2 is a schematic perspective view of the present invention.
Figure 3:
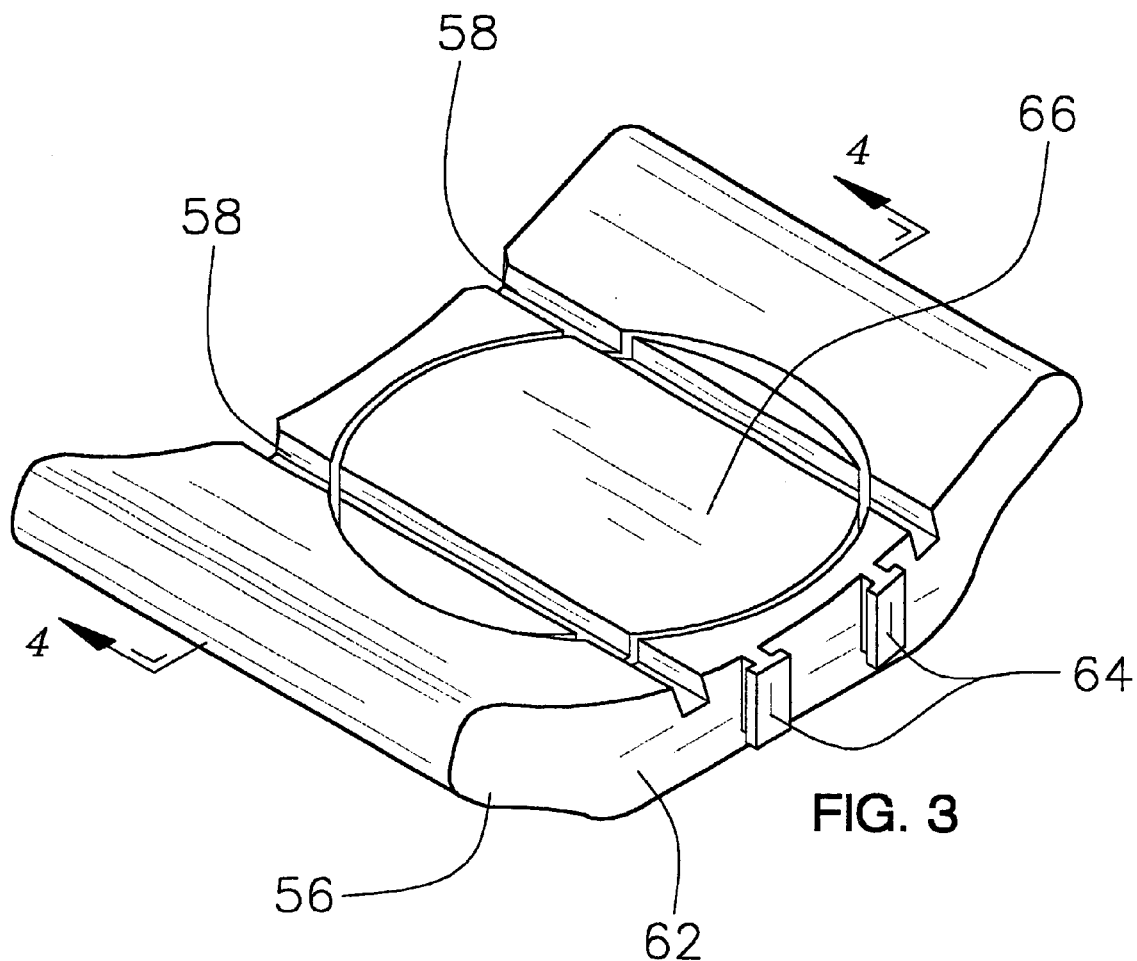
FIG. 3 is a schematic perspective view of the slide member of the present invention.
Figure 4:
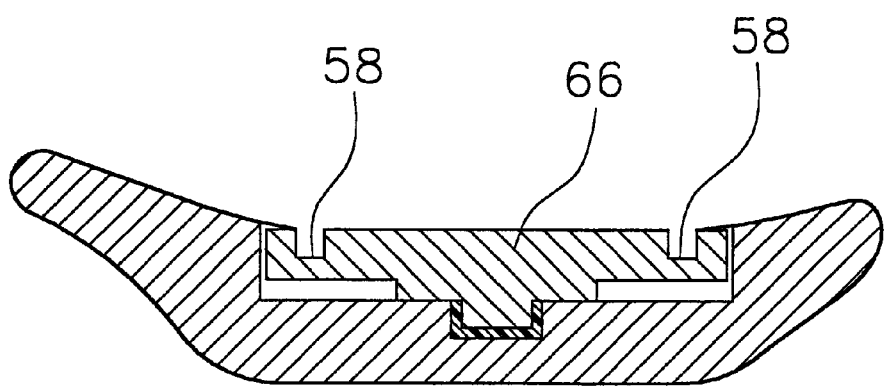
FIG. 4 is a schematic cross-sectional view taken along line 4—4 of FIG. 3 of the present invention.
Figure 5:
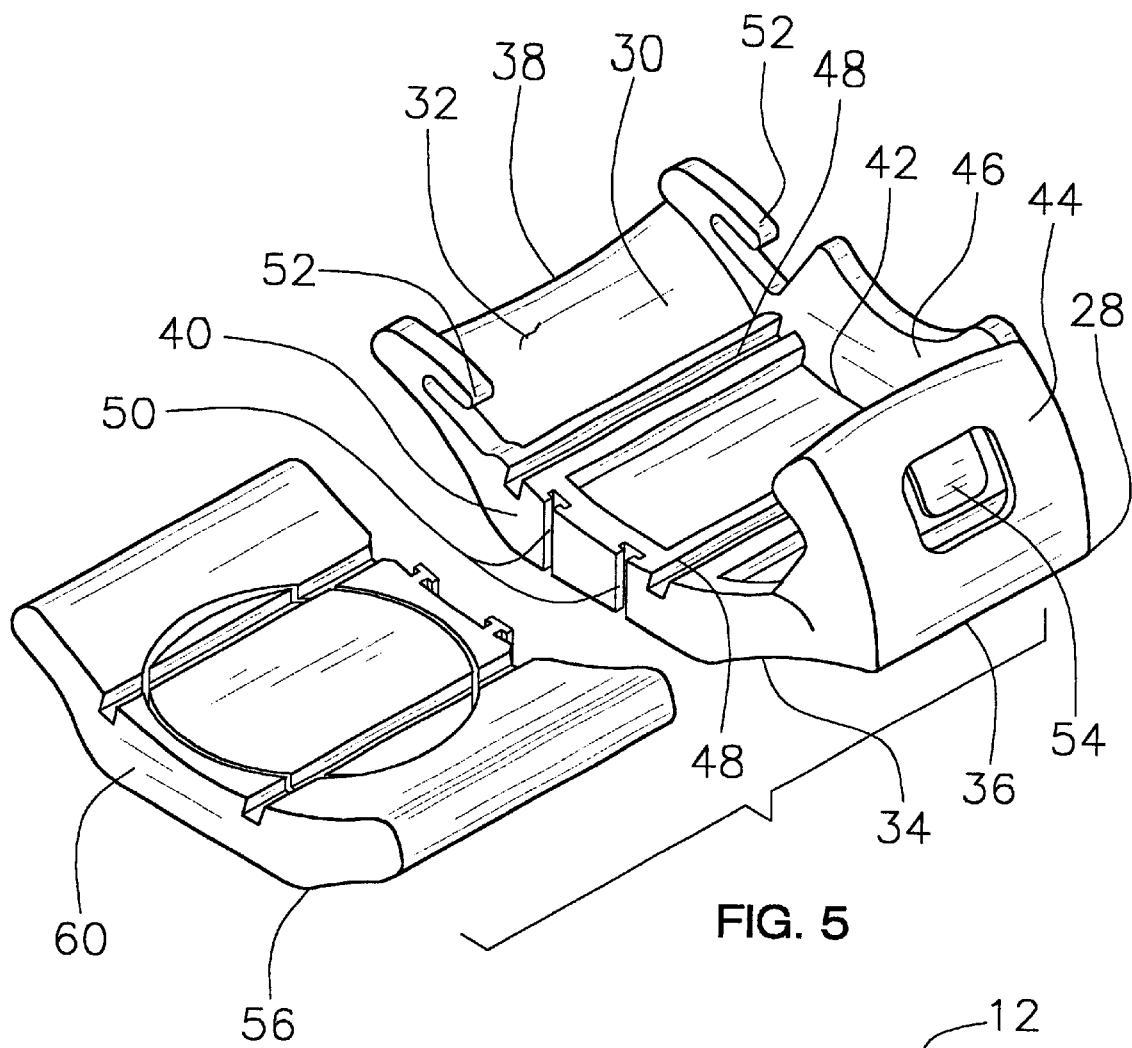
FIG. 5 is a schematic perspective view of the present invention.
Figure 6:
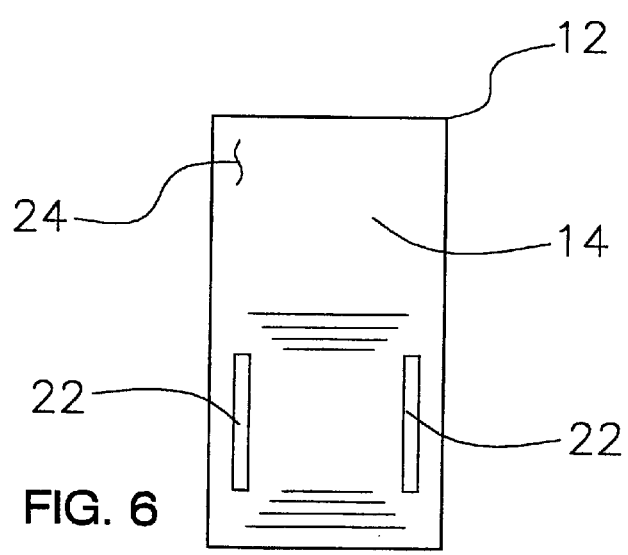
FIG. 6 is a schematic bottom view of the infant carrier of the present invention.

With reference now to the drawings, and in particular to FIGS. 1 through 6 thereof, a new infant carrier loading device embodying the principles and concepts of the present invention and generally designated by the reference numeral 10 will be described.

As best illustrated in FIGS. 1 through 6, the infant carrier loading device 10 generally comprises an infant carrier 12 having a bottom wall 14 and a pair of side walls 16 extending upwardly from the bottom wall 14. The bottom wall 14 has a generally rectangular shape and has a front edge 18 and a back edge 20. The bottom wall 14 is arcuate from the front edge 18 to the back edge 20 such that the front ant back edges extend upwardly. A pair of rails 22 is integrally coupled to a bottom surface 24 of the bottom wall 14. The rails 22 are spaced from each other and orientated generally parallel to each other. Each of the rails 22 are orientated generally perpendicular to the front 18 and back 20 edges. The carrier 12 preferably has a handle 26 thereon. The carrier 12 generally resembles a conventional infant carrier.

A base member 28 holds the infant carrier 12 to a car seat 6. The base member 28 comprises a rigid panel 30 having a top surface 32, a bottom surface 34, a front edge 36, a back edge 38, a first side edge 40 and a second side edge 42. A first wall 44 extends upwardly from the front edge 36. A second wall 46 extends upwardly from the second side edge 42. The top surface 32 has a size and shape adapted for receiving the bottom wall 14 such that the front edge 18 of the bottom wall 14 abuts the first wall. The top surface 32 has a pair of elongate grooves 48 therein extending from the first side edge 40 to the second side edge 42. The grooves 48 are orientated parallel to each other and are positioned to receive one of the rails 22. The first side edge 40 has a pair of channels 50 therein extending from the top surface 32 to the bottom surface 34. Each of the channels 50 generally has a T-shape. At least one hook member 52 is attached to the bottom wall for removably receiving the seatbelt 8. The base member 28 is also generally conventional and many are known in the prior art. Typically the base member 28 has a latch 54 thereon for securing the carrier 12 in place. The base member 28 and the carrier 12 are often available as one unit to ensure a secure fitting between the two.

A slide member 56 slides the carrier 12 onto the base member 28. The slide member 56 comprises a substantially rigid plate having a size and shape substantially equal to a size and shape of the panel 30 of the base member. The slide member 56 has a pair of slots 58 therein extending from a first side edge 60 to a second side edge 62. The second side edge 62 of the slide member 56 has a pair of brackets 64 thereon. Each of the brackets 64 has a shape adapted for extending into and releasably engaging one of the channels 50 such that each of the slots 58 in the slide member 56 are aligned with one of the grooves 48 in the base member 28. A top surface of the slide member has a disc 66 rotatably positioned therein such that the slots 58 extend through the disc 66.

In use, the rails 22 on the carrier 12 may be moved along the slots 58 and the grooves 48 for positioning on and removing the carrier 12 from the base member 28. The carrier 12 may be rotated when the rails 22 are positioned on the disc 66. This allows a user to position the base member 28 in the middle of the car seat 6 while sliding the carrier 12 over to a door of the vehicle. The ability to rotate the carrier 12 offers additional assistance for removing the carrier from a vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An infant carrier loading apparatus for loading an infant carrier onto a base member, the base member being positioned on a car seat and being secured by a seatbelt, a pair of rails being integrally coupled to a bottom surface of a bottom wall of the infant carrier and being spaced from each other and orientated generally parallel to each other, each of said rails being orientated generally perpendicular to a front edge of the carrier, said base member including a rigid panel having a top surface having a pair of elongate grooves therein extending from a first side edge to a second side edge of the base member and each positioned to receive one of said rails, said apparatus comprising:

a slide member for sliding said carrier onto said base member, said slide member comprising a substantially rigid plate having a size and shape substantially equal to a size and shape of said panel of said base member, said slide member having a pair of slots therein extending from a first side edge to a second side edge; and wherein said second side edge of said slide member may be abutted against said first side edge of said base member such that said slots are generally aligned with said grooves, wherein said rails on said carrier may be moved along said slots and said grooves for positioning on and removing said carrier from said base member.

2. The infant carrier loading apparatus as in claim 1, wherein said second side edge of said slide member has a pair of brackets thereon, each of said brackets being removably attachable to said first side edge of said base member such that each of said slots in said slide member are aligned with one of said grooves in said base member.

3. The infant carrier loading apparatus as in claim 2, wherein a top surface of said slide member has a disc rotatably positioned therein such that said slots extend through said disc, wherein said carrier may be rotated when said rails are positioned on said disc.

4. The infant carrier loading apparatus as in claim 1, wherein a top surface of said slide member has a disc rotatably positioned therein such that said slots extend through said disc, wherein said carrier may be rotated when said rails are positioned on said disc.

5. An infant carrier loading system for positioning a child on a car seat and being secured by a seatbelt, said system including:

an infant carrier having a pair of rails being integrally coupled to a bottom surface of a bottom wall of the infant carrier and being spaced from each other and orientated generally parallel to each other, each of said rails being orientated generally perpendicular to a front edge of the carrier;

a base member being positioned on the car seat and being secured by the seatbelt, said base member including a rigid panel having a top surface having a pair of elongate grooves therein extending from a first side edge to a second side edge of the base member and each positioned to receive one of said rails;

a slide member for sliding said carrier onto said base member, said slide member comprising a substantially rigid plate having a size and shape substantially equal to a size and shape of said panel of said base member, said slide member having a pair of slots therein extending from a first side edge to a second side edge; and wherein said second side edge of said slide member may be abutted against said first side edge of said base member such that said slots are generally aligned with said grooves, wherein said rails on said carrier may be moved along said slots and said grooves for positioning on and removing said carrier from said base member.

6. The infant carrier loading apparatus as in claim 5, wherein said second side edge of said slide member has a pair of brackets thereon, each of said brackets being removably attachable to said first side edge of said base member such that each of said slots in said slide member are aligned with one of said grooves in said base member.

7. The infant carrier loading apparatus as in claim 6, wherein a top surface of said slide member has a disc rotatably positioned therein such that said slots extend through said disc, wherein said carrier may be rotated when said rails are positioned on said disc.

8. The infant carrier loading apparatus as in claim 5, wherein a top surface of said slide member has a disc rotatably positioned therein such that said slots extend through said disc, wherein said carrier may be rotated when said rails are positioned on said disc.

9. An infant carrier loading system for positioning a child on a car seat and being secured by a seatbelt, comprising:

an infant carrier having a bottom wall and a pair of side walls extending upwardly from said bottom wall, said bottom wall having a generally rectangular shape and having a front edge and a back edge, said bottom wall being arcuate from said front edge to said back edge such that said front ant back edges extend upwardly, a pair of rails being integrally coupled to a bottom surface of said bottom wall and being spaced from each other and orientated generally parallel to each other, each of said rails being orientated generally perpendicular to said front and back edges;

a base member for holding said infant carrier to the car seat, said base member comprising a rigid panel having a top surface, a bottom surface, a front edge, a back edge, a first side edge and a second side edge, a first wall extending upwardly from said front edge, a second wall extending upwardly from said second side edge, said top surface having a size and shape adapted for receiving said bottom wall such that said front edge of said bottom wall abuts said first wall, said top surface having a pair of elongate grooves therein extending from said first side edge to said second side edge, said grooves being orientated parallel to each other and being positioned to receive one of said rails, said first side edge having a pair of channels therein extending from said top surface to said bottom surface, each of said channels generally having a T-shape, at least one hook member being attached to said bottom wall for removably receiving the seatbelt;

a slide member for sliding said carrier onto said base member, said slide member comprising a substantially rigid plate having a size and shape substantially equal to a size and shape of said panel of said base member, said slide member having a pair of slots therein extending from a first side edge to a second side edge, said second side of said slide member having a pair of brackets thereon, each of said brackets having a shape adapted for extending into and releasably engaging one of said channels such that each of said slots in said slide member are aligned with one of said grooves in said base member, a top surface of said slide member having a disc rotatably positioned therein such that said slots extend through said disc; and wherein said rails on said carrier may be moved along said slots and said grooves for positioning on and removing said carrier from said base member, wherein said carrier may be rotated when said rails are positioned on said disc.

* * * * *